United States Patent [19]

Ney et al.

[11] Patent Number: 5,431,331

[45] Date of Patent: Jul. 11, 1995

[54] THERMAL RESILIENT MULTIPLE JAW BRAZE FIXTURE

[76] Inventors: Robert Ney, 1716 Cypress Ave., Belleair, Fla. 34616; Alex J. Perrone, 3005 Fontanar St., Lutz, Fla. 33549

[21] Appl. No.: 212,881

[22] Filed: Mar. 15, 1994

[51] Int. Cl.⁶ .............................................. B23K 3/00
[52] U.S. Cl. ................................... 228/212; 228/49.1; 269/287
[58] Field of Search ...................... 228/49.1, 49.3, 212; 269/287

[56] References Cited

U.S. PATENT DOCUMENTS

| | | | |
|---|---|---|---|
| 2,869,498 | 1/1959 | Whittington | 228/49.1 |
| 3,726,466 | 4/1973 | Vedder et al. | 228/44.1 |
| 3,752,382 | 8/1973 | Furnival | 228/44.1 X |
| 3,941,293 | 3/1976 | Chartet | 228/44.1 |
| 3,995,805 | 12/1976 | Gersbacher | 228/44.1 R |
| 4,108,346 | 8/1978 | Minix et al. | 228/49.4 |
| 4,128,235 | 12/1978 | Gersbacher | 228/212 X |

*Primary Examiner*—Kenneth J. Ramsey
*Attorney, Agent, or Firm*—Foley & Lardner

[57] ABSTRACT

A braze fixture has side walls forming a cavity with an opening to receive a stack of parts to be brazed. Sidewalls of the housing have a plurality of bearing receiving openings into which bearing rods or jaws are inserted to align the stacked elements of the workpiece. The housing can also have view ports to allow a visual check of the alignment. Straps or wires around the fixture are selected to have thermal characteristics similar to the thermal characteristics of the workpiece undergoing brazing. The straps or wires make physical contact with the bearing rods thereby causing bearing rods to maintain the workpiece in proper alignment throughout the entire brazing cycle.

16 Claims, 5 Drawing Sheets

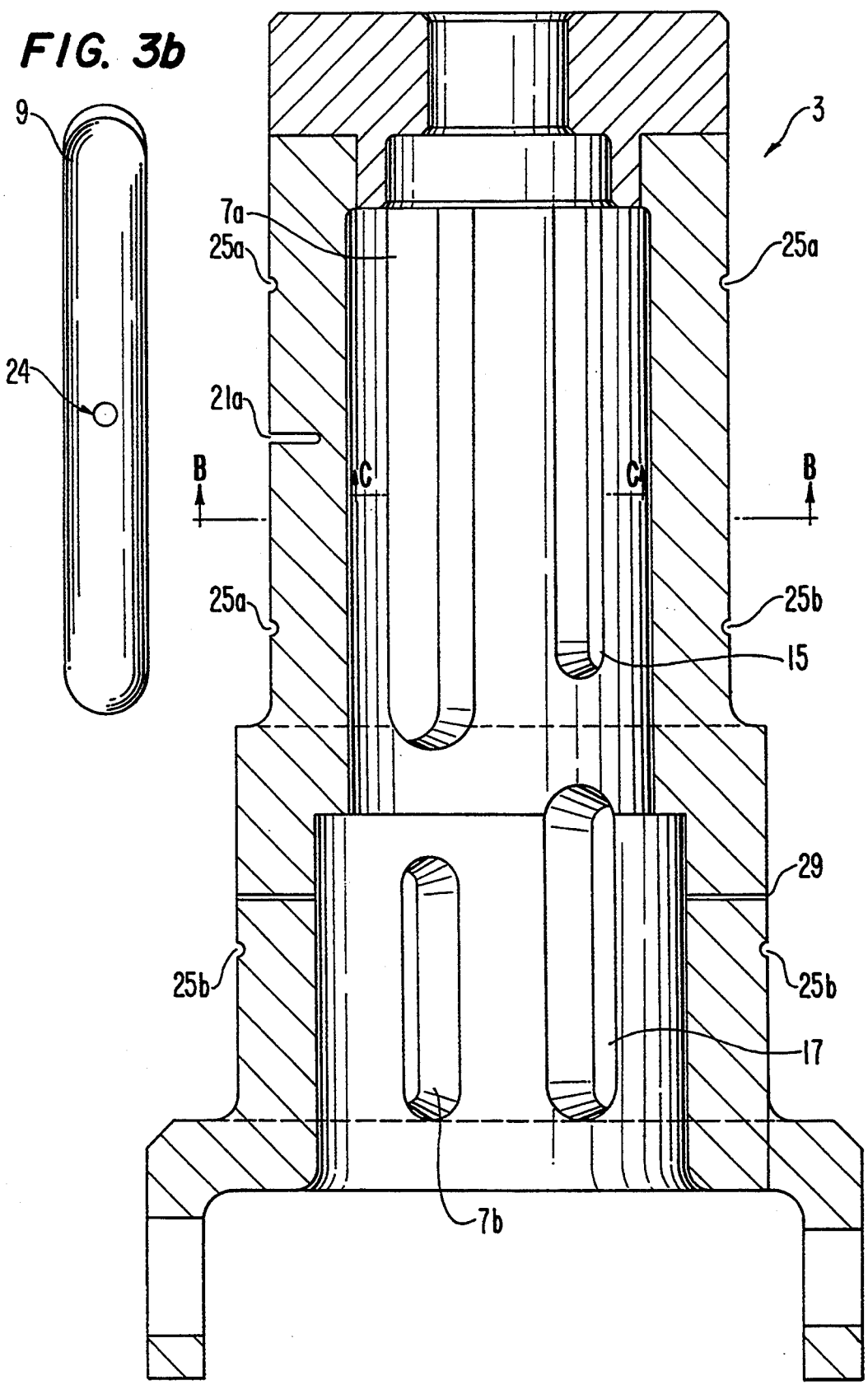

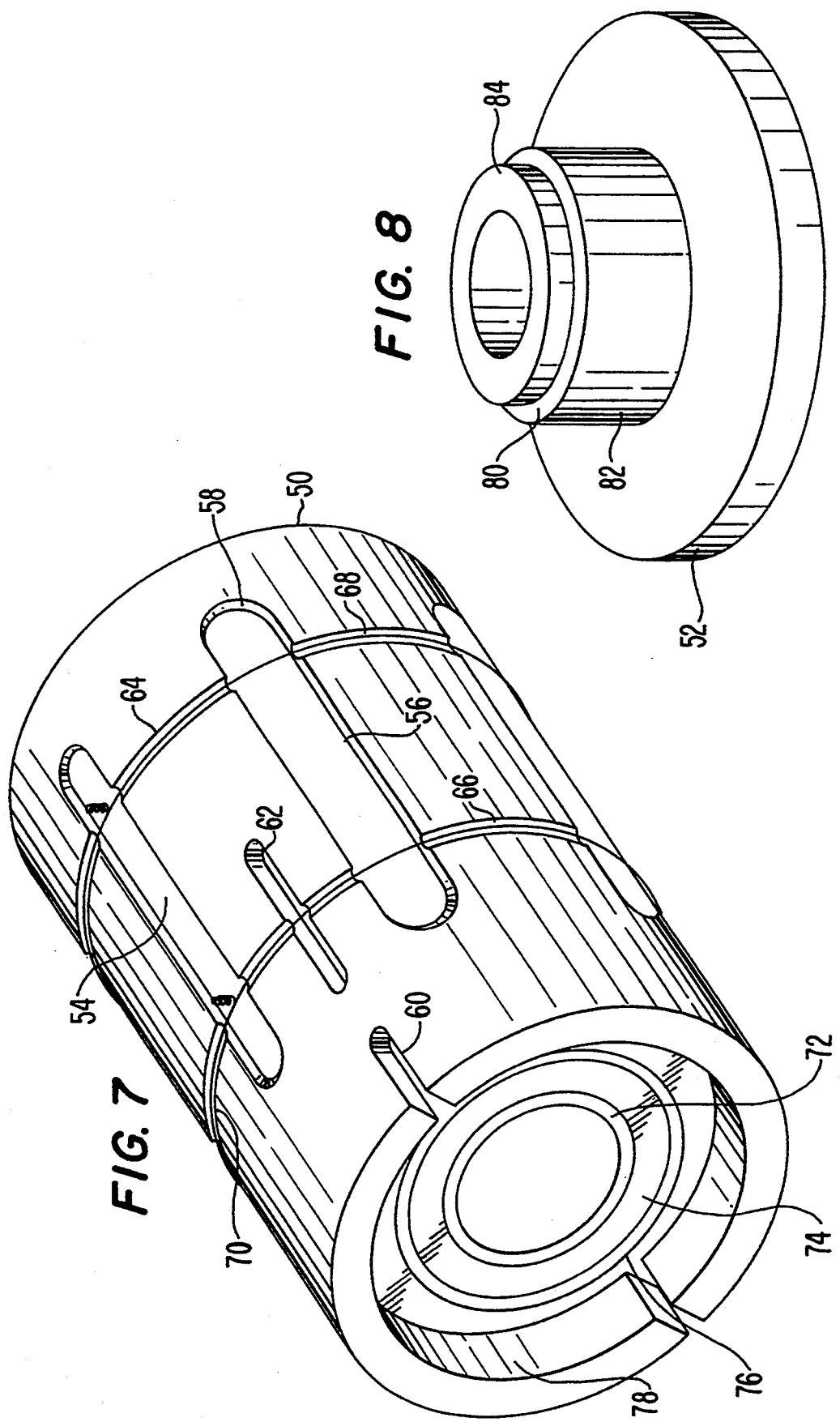

THERMAL RESILIENT MULTIPLE JAW BRAZE FIXTURE

The United States Government has rights in this invention pursuant to contract No. DE-AC04-92AL73000 between the United States Department of Energy and Martin Marietta Specialty Components. Inc.

FIELD OF THE INVENTION

The invention relates to fixtures used in brazing and, in particular, to braze fixtures which align workpieces.

RELATED ART

A braze fixture is used to hold and locate components of a workpiece for brazing. It is conventional to accomplish brazing with a close-fitting solid fixture into which the workpiece is inserted. However, if the fixture fits too closely, it may not be possible to remove the finished workpiece. Therefore, braze fixtures are conventionally designed and built to be larger than the workpiece to facilitate its removal. In a vertical braze fixture, the additional area around the workpiece needed to facilitate removal can lead to misalignment of the individual components of the workpiece undergoing brazing.

U.S. Pat. No. 3,995,805 to Gersbacher discloses a braze fixture for receiving and positioning stacked parts and holding parts assembled during brazing. The Gersbacher braze fixture includes locators which position the stacked parts in accordance with the desired heat exchanger configuration. The locators are influenced by gravity to occupy a parts locating position and are capable of a controlled sliding motion. During brazing, engagement of the locators with the assembly of parts is maintained throughout the temperature rise to insure a relationship of the parts. In Gersbacher, each part locator has a plate-like form which is generally rectangular in configuration and has one end cut off to have a uniformly sloping surface. The locators are confined and guided by posts into ramps on which the locators are supported. These locators have inwardly orienting side edges for cooperation with the corner of a workpiece, such as an assembled heat exchanger, to be brazed. The indented edge portions of the locators effectively define a rectangular enclosure within which the parts assembly is received and held against inadvertent dislocation. When the core is placed under compression, the parts locators secure the heat exchanger core at its four corners. This securing occurs because the locators are relatively heavy plate-like elements influenced by their mounts on the ramps to make a positive containment of the relatively light parts which make up the assembled core.

U.S. Pat. No. 4,108,346 to Minix discloses an alignment clamp in which a strap passes between two plates defining a minimum gap ordinarily necessary for welding adjacent plates. The strap is placed under substantial tension to apply a clamping force on both sides of the plates resulting in alignment of the plates.

The braze fixture of Gersbacher is inconvenient because the locators themselves define a rectangular enclosure within which the parts assembly is received and is held against inadvertent dislocation. Thus, it may be necessary to disassemble at least a portion of the rectangular enclosure in order to remove the brazed workpiece. In addition, the Gersbacher enclosure is mechanically complex and cannot accommodate a strap, such as that disclosed in Minix. Neither Gersbacher nor Minix disclose a simple single housing which can be used for brazing a stack of parts.

In addition, conventional brazing fixtures, including those of Minix and Gersbacher, provide no active thermal expansion compensation during the brazing cycle. Thus, conventional braze fixtures fail to provide precision alignment of components of a workpiece which experiences thermal deformation during the brazing cycle.

SUMMARY AND OBJECTS OF THE INVENTION

In view of the limitations of conventional braze fixtures, it is an object of the invention to provide a braze fixture which provides an ability to accurately align an assemblage of parts, such as ceramic and metal parts, during the braze cycle.

It is still another object of the invention to provide a braze fixture which is sufficiently large to account for the tolerance of components of a workpiece to be brazed while maintaining accurate alignment of the parts throughout the braze cycle.

It is still another object of the invention to provide a braze fixture with bearings that impinge on the assemblage of parts to provide active alignment.

It is still another object of the invention to provide a braze fixture with a housing to accommodate such bearings.

It is still another object of the invention to provide a braze fixture which compensates for thermal expansion during the braze cycle to maintain parts alignment.

It is still another object of the invention to provide active thermal compensation in the braze fixture by allowing bearings, referred to herein as jaws, in the housing of the fixture to adjust position during the braze cycle while maintaining alignment of workpiece components.

The above and other objects of the invention are accomplished by a braze fixture which includes a housing having side walls forming a cavity therein. A portion of the housing has an opening to receive a plurality of parts in a stacked arrangement in the cavity. The housing also has at least one bearing-receiving opening in the side walls. The braze fixture also includes at least one bearing with each bearing being dimensioned for receipt into one of the opening in the side walls. When received in the side wall, the bearing protrudes into the cavity to align parts stacked in the cavity. A strap surrounds an outer circumference of the housing to hold the bearings in position. The strap makes direct contact with the bearings and is made of a material having a thermal expansion characteristic which results in active expansion compensation during a brazing cycle. This active expansion compensation is accomplished by selecting a wire material which has a thermal characteristic similar to the thermal characteristic of the assembled parts.

A brazing fixture according to the invention can also include a base on which the housing is placed. The base is dimensioned to receive a bottom one of the components to be brazed and maintain its alignment. The housing may also include one or more view ports which provide a user the ability to check the alignment of components to be brazed.

The bearings or jaws which fit into the slots in the housing may also include holes through which a retaining wire is placed, so that upon removal of the workpiece after brazing, the bearing or rod remains in its slot.

A braze fixture according to the invention may be in any desired shape, such as round, rectangular, or any other desired configuration, and may include any number of bearing members appropriate to the alignment requirements of the brazing application. A braze fixture according to the invention may also include a plurality of sections such that different components of a workpiece are aligned in different positions.

BRIEF DESCRIPTION OF THE DRAWINGS

The above and other objects of the invention are met by a braze fixture, as described herein, with reference to the drawings, in which;

FIG. 3a is a sectional view of a housing of a six jaw braze fixture according to the invention;

FIG. 3b is a sectional view of a bearing rod;

FIG. 7 is a perspective view from the underside of the housing of a three jaw braze fixture according to the invention, with a workpiece inserted; and FIG. 8 is a view of a base for a three jaw braze fixture according to the invention.

DETAILED DESCRIPTION OF THE PREFERRED EMBODIMENTS

Figure 1:
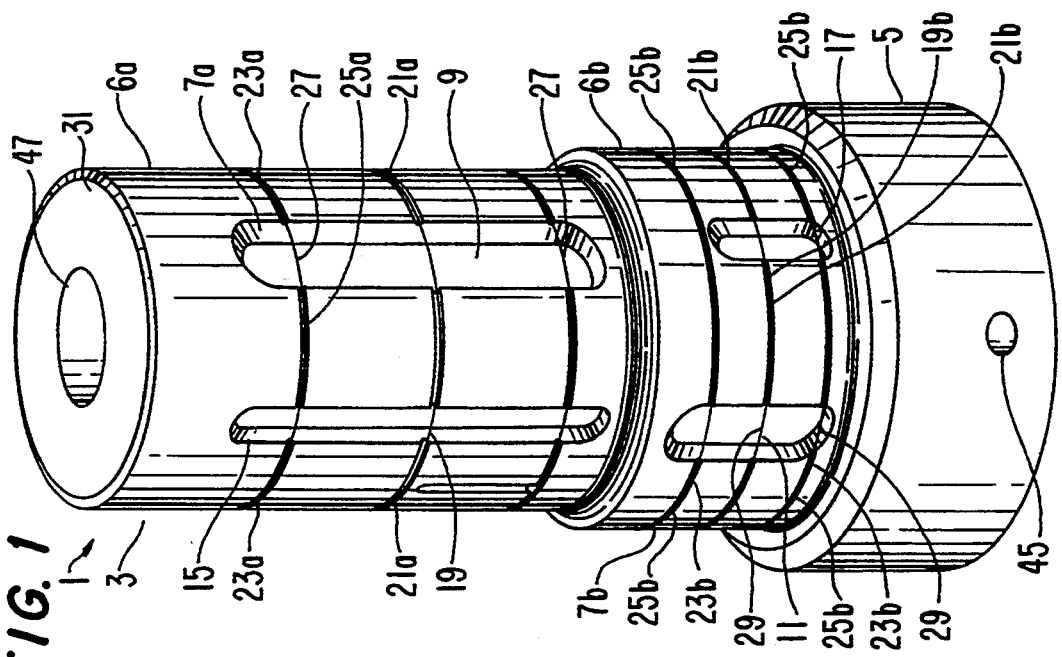
FIG. 1 shows a perspective view of a six jaw braze fixture according to the invention.

FIG. 1 illustrates a six jaw braze fixture, shown generally at 1, according to the invention. The unit includes an upper portion or housing 3, which is illustrated in section in FIGS. 3 and 4. Housing 3 sits on base 5 which is shown in section in FIG. 5. The housing 3 itself of six jaw braze fixture 1 has a first or upper portion 6a and lower portion 6b. The upper portion has formed therein a plurality of slots 7a which receive bearing rods or jaws 9. Lower portion 6b also has a plurality of slots 7b formed therein to receive rods 11. For the six jaw braze fixture shown upper section 6a has three such bearing receiving slots 7a and lower portion 6b has three bearing receiving slots 7b.

Figure 2:
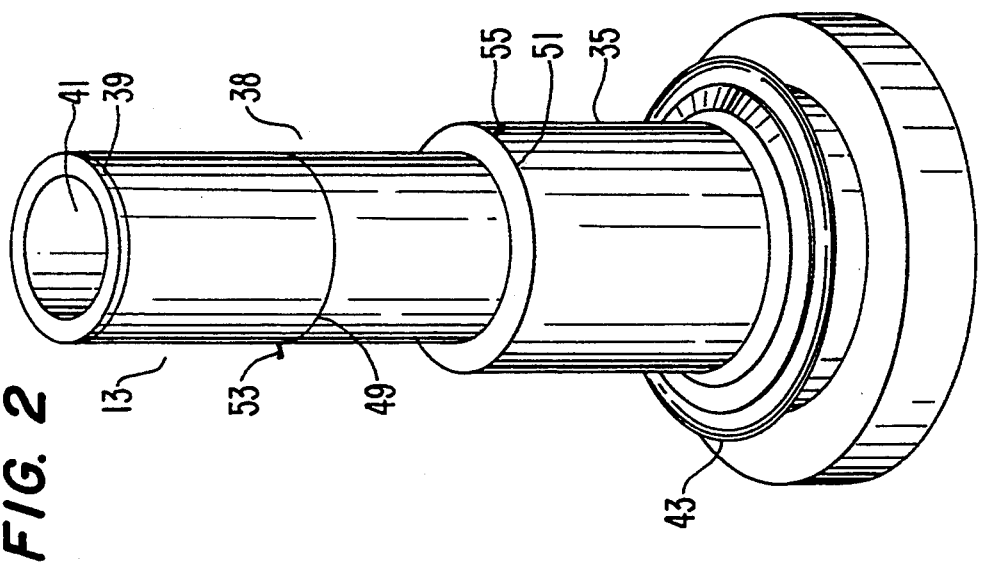
FIG. 2 shows a perspective view of a typical workpiece that would be brazed in the fixture of FIG. 1.

Rods 9 and 11 are formed with a shape and dimension so as to slide in and out of slots 7a and 7b respectively. Similarly, bearing rods 11 are dimensioned to slide in and out of slot 7b in the lower portion 6b of housing 3. As discussed further herein, a workpiece of stacked parts is inserted into the housing, such that when rods 9 and 11 are placed in slots 7a and 7b, they bear against a workpiece shown generally at 13 in FIG. 2.

Housing 3 also has a plurality of slots or openings 15 in the upper portion 6a of the housing and 17 in the lower portion 6b of the housing. Slots 15 and 17 may be of any convenient dimension and provide view ports through which it is possible to view the alignment of the workpiece 13 when placed in the braze fixture.

Figure 4:
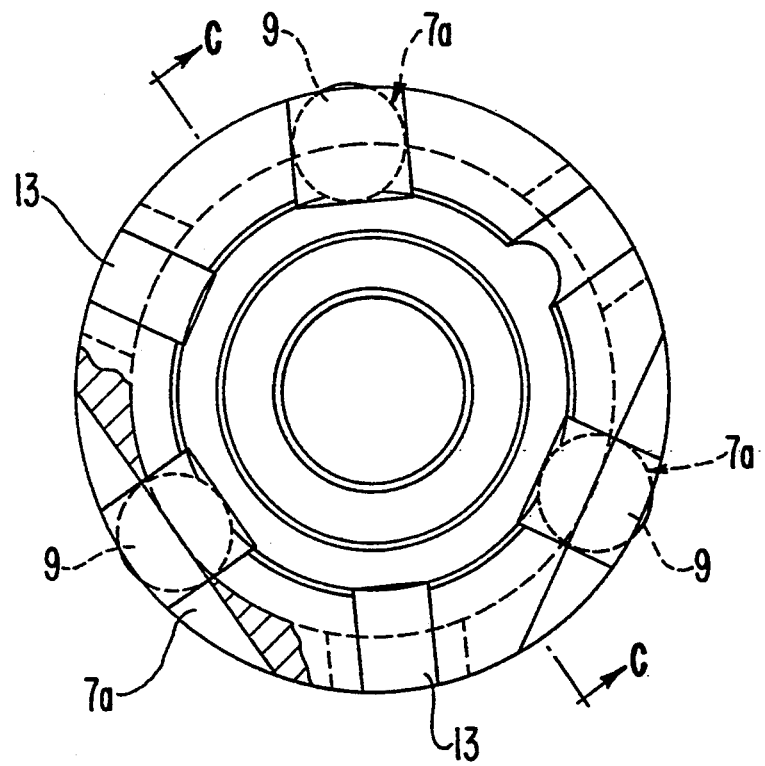
FIG. 4 is a sectional view of FIG. 2 along section line B—B.

As shown in the sectional view in FIG. 4, the top portion of the braze fixture has a plurality of slots 7a located around the circumference of the braze fixture to accommodate bearing rods or jaws 9. Three such slots 7a are shown. In addition, three view ports 13 are shown in FIG. 4. A sectional view through the lower portion 6b of housing 3 would show a similar configuration of slots and view ports.

Each portion 6a and 6b of housing 3 is further equipped with a retaining wire 19a and 19b. The retaining wires fit into grooves in the housing 21a, and 21b, respectively. Retaining wire 19a passes through hole 24 in bearing rod 9 as shown in FIG. 3b. Retaining wire 19b passes through a similarly positioned hole in retaining rod 11. The purpose of retaining wires 19a and 19b is to prevent the rods from falling into or out of the housing upon removal of the workpiece. The use of such retaining wires avoids the need to reassemble the rods in the housing, thereby saving time and maintaining the housing as a single fixture.

A brazing fixture according to the invention has straps or wires surrounding the outer circumference of the housing to hold the bearing rods in position. The straps or wires can be used to provide active expansion compensation. The upper section 6a of housing 3 employs thermal compensation straps in the form of thermal compensation wires 23a which are located in grooves 25a around the circumference of the upper portion 6a of housing 3. Similarly, lower section 6b of housing 3 as thermal expansion compensation wires 23b located in circumferential grooves 25b. Thermal expansion compensation wires 23a and 23b make positive contact with portions 27 and 29 of the exterior surface of rods 9 and 11, respectively. Thermal expansion compensation wires 23a and 23b extend only partially into the depth of grooves 25a and 25b, respectively, in order to provide radial alignment without exerting excessive force on bearing rods 9 and 11. Thermal compensation wires 23a and 23b are relatively thin, typically about 0.010 inch diameter, in order to be relatively weak relative to the workpiece and to be able to stretch without exerting excessive force on bearing rods 9 and 11, hence avoiding excessive force on the workpiece. Because the thermal compensation wires 23a and 23b are relatively thin and weak with respect to the workpiece, and because there exists a relatively small perpendicular force component to the thermal compensation wire, the apparatus according to the invention is not substantially sensitive to excessive tension in the thermal compensation wires.

Bearing rods 9 and 11 protrude into an interior cavity 31 formed by the walls of the housing. As bearing rods 9 and 11 protrude into the cavity, they bear on sections 33 and 35 of a workpiece inserted therein for brazing. Since the rods are distributed around the workpiece, for example, as shown in FIG. 4, they exert a bearing force on the workpiece causing it to remain in alignment.

During a brazing cycle, a workpiece may expand and contract as a result of thermally induced effects. Thermal expansion compensation wires 23a and 23b are selected to have thermal characteristics similar to the thermal characteristics of the workpiece under going brazing. For example, where ceramic and metal components undergo brazing in a ceramic braze fixture according to the invention, the wire used is typically molybdenum wire. Thus, thermal expansion compensation wires 23a and 23b will undergo thermal effects similar to those undergone by the workpiece. As a result, bearing rods 9 and 11 will correspondingly shift, while maintaining alignment of the workpiece elements 33 and 35.

Thermal compensation wires 23a and 23b are inserted only partially into the depth of grooves 25a and 25b, which guide the thermal compensation wires, and bear against the jaws or bearing rods to exert a force on them. Due to the flexibility of the thermal compensation wires 23a and 23b, at all times the bearing rods maintain the workpiece in alignment without exerting excessive force, which could cause cracks in the workpiece. Wires 23a and 23b may also be slightly bent to guarantee positive contact between the wire and the rod so that the rod pushes the wire out from the bottom of the groove to maintain sufficient alignment without excessive force. When the thermal expansion compensation wires 23a and 23b are tight, during assembly the bearing rods 9 and 11 stress the wires creating tension in the wires. Thermal expansion compensation wires are chosen to be of a material that does not substantially weaken and substantially retains its elasticity at temperatures experienced during the brazing cycle. As noted elsewhere herein, an example of one such material is molybdenum. As a result, the wire acts as a spring on the bearing rod or jaw to allow the bearing rod to maintain pressure against the workpiece. In each section 6a, 6b of housing 3, the flanges and ceramic parts of the workpiece have approximately the same outer dimension so that each bearing rod 9, 11 bears on all the corresponding components of the workpiece to maintain their alignment.

During the brazing cycle, the weight of the fixture bears down on the workpiece, which collapses slightly during brazing. The bearing rods 9 and 11, held by thermal compensation wires 23a and 23b maintain alignment of the workpiece without restricting its axial collapsing movement.

Figure 5:
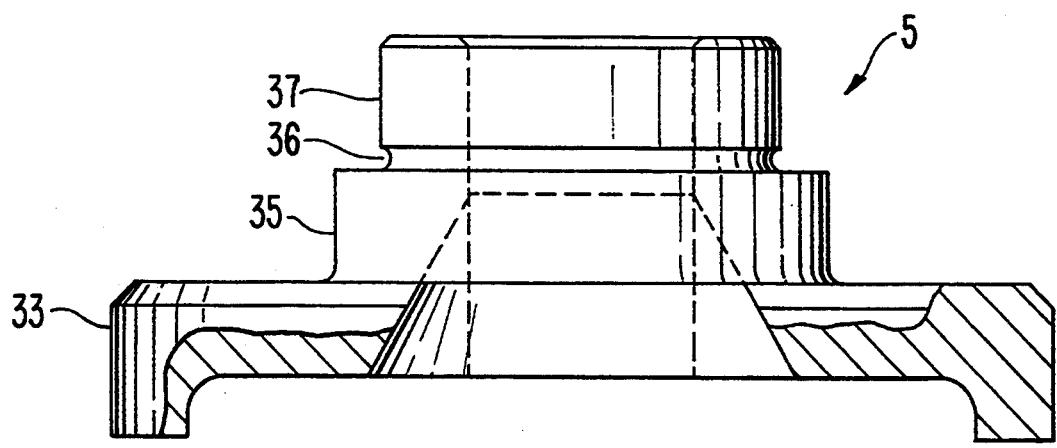
FIG. 5 is a sectional view of a base for the six jaw brazed fixture.

The sectional view of the base shown in FIG. 5 illustrates that the base is generally pedestal shaped with a bottom section 33, and intermediate section 35 and an upper section upper section 37. Housing 3 fits on top of lower section 33 around intermediate section 35 and upper section 37. Intermediate section 35 has an upper surface 36 which accommodates a back up ring (not shown) near the bottom of workpiece 13. The workpiece fits over upper pedestal 37, which centers and aligns the workpiece in the braze fixture. Thus the base aligns the last flange of the workpiece from the inside and provides a mounting for the back up ring which is directly under the bottom ceramic ring. Such back up rings relieve thermal stress at the interface between materials of different composition. For example, in workpiece 13 back up ring 39 near the top of the workpiece relieves thermal stress between workpiece element 38 and flange 41. For example, if flange 41 is made of Kovar ®, and element 38 is ceramic, small, ceramic back up ring 39 between ceramic element 38 and Kovar ® flange 41 absorbs approximately half of the thermal stress induced by the different temperature characteristics of Kovar ® flange 41 and ceramic element 38. This helps prevent cracking of the ceramic element 38. A similar condition exists with flange 43 at the bottom of workpiece 13. As previously noted herein, the top surface 36 of pedestal 35 accommodates the lower backup ring (not shown) under flange 43.

Base 5 also has vent hole 45. Upper housing 3 has a vent hole 47 to exhaust gas and radiate heat. The vent holes help to prevent cracking of the braze fixture in the workpieces.

Workpiece 13 also includes electrodes 49 and 51, which have tabs 53 and 55, respectively. The tabs can be arranged to protrude into the view ports 15 and 17 to avoid interfering with the alignment of the workpiece.

It should also be noted that view ports 15 and 17 are also used to provide room for securing together the ends of the thermal expansion compensation wires 23a, 23b, for example, by twisting the ends of the wires.

Figure 6:
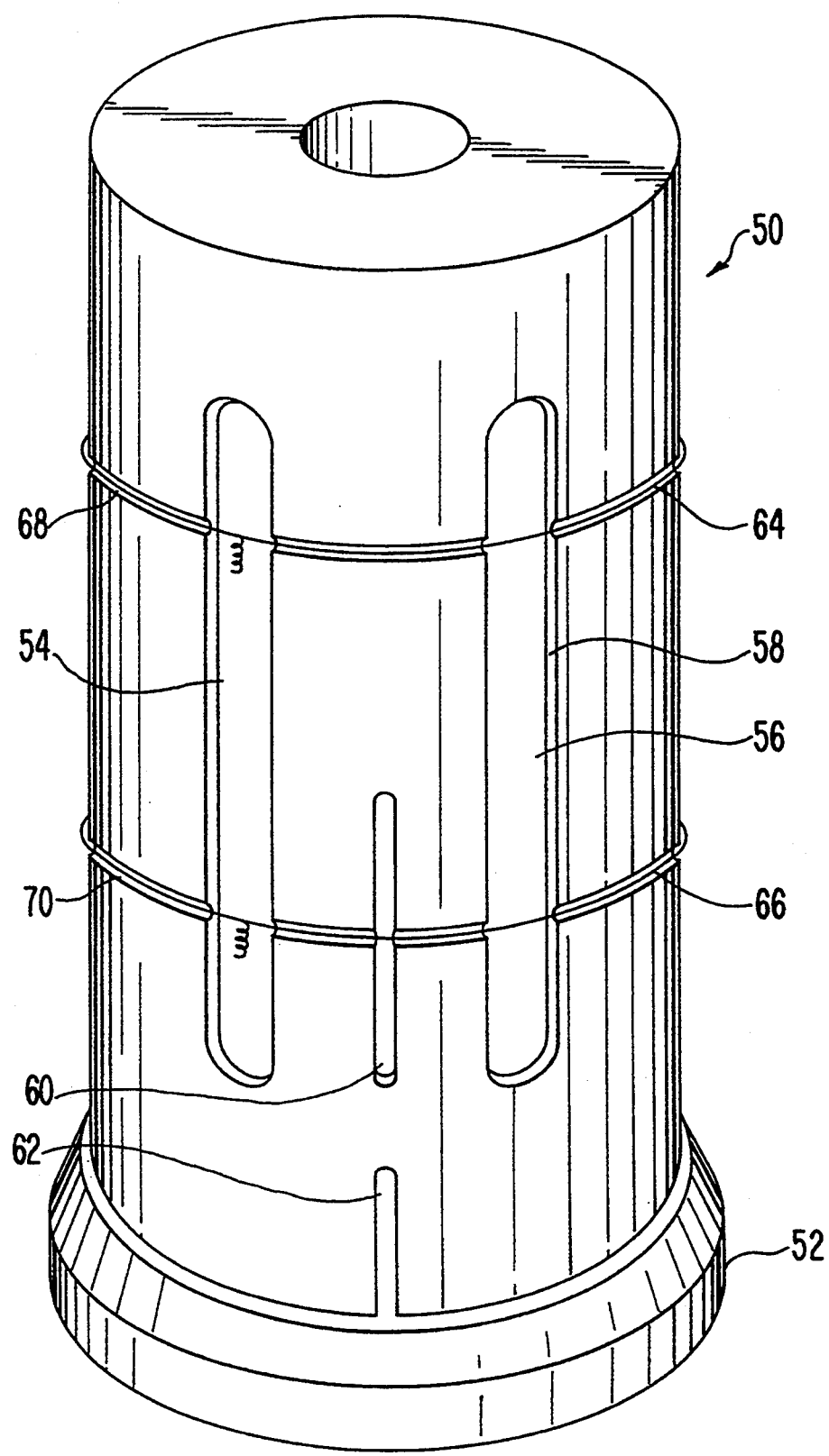
FIG. 6 is a view of a three jaw braze fixture according to the invention.

FIG. 6 is a view of a three jaw braze fixture according to the invention. The braze fixture of FIG. 6 has a similar configuration to that of the six jaw braze fixture previously described herein. In this case, housing 50, which rests on base 52 has view ports 54 and bearing rods 56 located in slots 58. The braze fixture also has slots 60 and 62 in housing 50 which can be used to accommodate electrodes in the workpiece and to accommodate tabs for additional electrical connections which may be desired. Thermal expansion compensation wires 64 and 66, are placed in circumferential grooves 68 and 70 and act in the same manner as that described in the six jaw configuration.

FIG. 7 is a perspective view from the underside of the housing of a three jaw braze fixture according to the invention. Workpiece 72 is shown having backup ring 74 and flange 76 at the bottom thereof. Workpiece 72 is shown within cavity 78 formed by the walls of housing 50. When mounted on base 52, backup ring 74 rests on the upper surface 80 of pedestal 82 while pedestal 84 centers the workpiece 72. During the brazing cycle, thermal expansion compensation wires 64 and 66, which are selected to have thermal characteristics similar to that of the workpiece, act to maintain rods 56 in position to maintain alignment of the elements of the workpiece centered by pedestal 84 of base 52 within cavity 78 of housing 50. The use of thermal expansion compensation wires provides active expansion compensation during the brazing cycle to maintain the required alignment.

The six jaw and three jaw braze fixtures disclosed herein are by way of illustration and not imitation. It will be known to those of ordinary skill that a braze fixture can be formed with any number of jaws appropriate to the size of the workpiece undergoing brazing. It will further be recognized by one of ordinary skill that the generally round shaped braze fixtures disclosed herein are also by way of illustration and not limitation, as a braze fixture with active expansion compensation can be configured with any desired shape.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A braze fixture comprising:
    a housing having sidewalls forming a cavity therein, a portion with an opening to receive a plurality of parts in a stacked arrangement in said cavity, and a bearing receiving opening in said sidewalls,
    a bearing dimensioned for receipt into said opening and when received therein to protrude into said cavity to thereby align parts stacked in said cavity; and
    a strap surrounding an outer circumference of said housing to hold said bearing in position.

2. The apparatus recited in claim 1, wherein said strap comprises a material having thermal expansion characteristics resulting in active expansion compensation during a brazing cycle.

3. The apparatus recited in claim 2, wherein said strap comprises a wire having thermal expansion characteristics similar to thermal expansion characteristics of a workpiece undergoing brazing.

4. The apparatus recited in claim 1, wherein said strap makes positive contact with said bearing.

5. The apparatus recited in claim 1, wherein said sidewalls are provided with a groove and said strap is mounted therein.

6. The apparatus recited in claim 5, wherein said strap mounted in said groove makes positive contact with said bearing.

7. The apparatus recited in claim 6, wherein said strap comprises a material having thermal expansion characteristics sufficiently similar to thermal expansion characteristics of a workpiece undergoing brazing, such that said strap maintains said bearing in a position to maintain alignment of said parts.

8. The apparatus recited in claim 7, wherein said strap comprises a wire having substantially the same elastic properties over a temperature range of a brazing cycle.

9. The apparatus recited in claim 8, wherein said wire is substantially insensitive to tension therein to maintain said bearing in a position to maintain alignment of said parts.

10. The apparatus recited in claim 1, wherein said strap is flexible over a temperature range of a brazing cycle such that said strap is substantially insensitive to tension therein to maintain said bearing in a position to maintain alignment of said parts.

11. The apparatus recited in claim 1, further comprising a retainer configured to retain said bearing in said opening after removal of said parts.

12. The apparatus recited in claim 11, wherein said retainer comprises a wire passing through said bearing, said wire being attached to said housing.

13. The apparatus recited in claim 1, further comprising a base, said base having a pedestal to receive and center a bottom one of said parts.

14. A method of brazing a plurality of parts in a stacked arrangement, the method comprising the steps of:
   placing said parts in a hollow housing having at least one opening in a sidewall thereof;
   inserting a bearing member into said opening such that one side of said bearing contacts said parts and thereby aligns said parts;
   placing a strap around said housing to contact said bearing; and
   applying heat to braze said parts.

15. The method recited in claim 14, further comprising controlling said bearing rod to exert a force sufficient throughout a brazing cycle with said strap.

16. The method recited in claim 15, wherein said strap is selected to have a thermal expansion characteristic resulting in said bearing rod exerting said sufficient force.

* * * * *